(12) United States Patent
Dowek et al.

(10) Patent No.: US 7,941,122 B2
(45) Date of Patent: May 10, 2011

(54) DEVICE AND PROCESS FOR WIRELESS LOCAL AREA NETWORK ASSOCIATION

(75) Inventors: Eric Dowek, Axford (GB); Trevor Moore, Geel (BE); Karel Van Doorselaer, Edegem (DE)

(73) Assignee: Thomson Licensing, Boulogne-Billancourt (FR)

( * ) Notice: Subject to any disclaimer, the term of this patent is extended or adjusted under 35 U.S.C. 154(b) by 955 days.

(21) Appl. No.: 11/631,752

(22) PCT Filed: Jul. 5, 2005

(86) PCT No.: PCT/EP2005/053193
§ 371 (c)(1),
(2), (4) Date: Jul. 27, 2007

(87) PCT Pub. No.: WO2006/003202
PCT Pub. Date: Jan. 12, 2006

(65) Prior Publication Data
US 2007/0264973 A1  Nov. 15, 2007

(30) Foreign Application Priority Data
Jul. 7, 2004 (EP) ..................... 04447166

(51) Int. Cl.
*H04M 1/66* (2006.01)
(52) U.S. Cl. ....... 455/411; 455/41.1; 455/41.2; 370/338
(58) Field of Classification Search .......... 455/41.1, 455/41.2, 433, 435.1, 517, 550.1; 370/338, 370/245
See application file for complete search history.

(56) References Cited

U.S. PATENT DOCUMENTS

| 7,006,838 | B2 * | 2/2006 | Diener et al. | 455/456.1 |
|---|---|---|---|---|
| 7,277,932 | B2 * | 10/2007 | Adachi et al. | 709/220 |
| 7,283,820 | B2 * | 10/2007 | Kamijo et al. | 455/435.1 |
| 2002/0061748 | A1 * | 5/2002 | Nakakita et al. | 455/435 |
| 2003/0217168 | A1 | 11/2003 | Adachi et al. | |
| 2005/0003828 | A1 * | 1/2005 | Sugar et al. | 455/456.1 |
| 2010/0210242 | A1 * | 8/2010 | Caudevilla Laliena et al. | 455/411 |

FOREIGN PATENT DOCUMENTS

WO   WO 2004/034214   4/2004

OTHER PUBLICATIONS

Search Report Dated Oct. 25, 2005.

* cited by examiner

*Primary Examiner* — CongVan Tran
(74) *Attorney, Agent, or Firm* — Robert D. Shedd; Jeffrey M. Navon

(57) ABSTRACT

The present invention concerns WLAN association device and process for associating a new station to a WLAN, via a central apparatus. The association device comprises receiving and sending means for exchanging signals between the station and central apparatus, recording means for recording the station as part of the WLAN, under wireless exchanges between the station and central apparatus initiated by an association request sent by the station, and management means for managing the identity of the WLAN. The association device comprises time window means triggering the opening of a time window, the recording means being able to be initially activated only during the opening of that time window. Further, the management means automatically activates a temporary service set identifier for the recording of the station during the time window.

18 Claims, 4 Drawing Sheets

DEVICE AND PROCESS FOR WIRELESS LOCAL AREA NETWORK ASSOCIATION

This application claims the benefit, under 35 U.S.C. §365 of International Application PCT/EP2005/053193, filed Jul. 5, 2005, which was published in accordance with PCT Article 21(2) on Jan. 12, 2006 in English and which claims the benefit of European patent application No. 04447166.2, filed on Jul. 7, 2004.

The present invention relates to wireless local area network association device and process and to corresponding products.

For associating a new product in a wireless local area network, henceforth referred to as WLAN, it is generally necessary to have an access point node in the network, which is provided by one of the apparatus of the network. Notably, this apparatus may be a modem, such as for example a DSL modem (for "Digital Subscriber Line"). The product to be connected to form a new node may be for example a wireless set-top-box, video streamer, Internet audio device, VoIP phone (for "Voice over Internet Protocol"), or other wireless client.

Two different criteria have been deemed important for wireless associations. First, it is recommended that the operations to be executed by the user remain friendly, and do not require too many and complicated actions. Secondly, the association is risky, because a non-authorized person could try to remotely connect in order to obtain confidential information from the network. Thus, security constitutes a second important aspect to take care of.

Those two criteria have proved relatively difficult to reconcile, because security mechanisms generally require some specific operations or data input from the user, which can be laborious, or dedicated additional material. On the other hand, increased user-friendliness often tends to go hand-in-hand with a decrease in security level, as compensation for a reduction in the connection steps and necessary data input required.

A current solution thus comprises a step of manual configuration of the device to be connected, herein below called "station", with an identifier of the network or of a cell covered by one or several access points. That identifier is currently known as an SSID (for "Service Set IDentifier"). A security key is also configured in the station, that key being compliant with a wireless security standard such as notably WEP (for "Wired Equivalent Privacy") or WPA (for "Wi-Fi Protected Access", standard introduced by the Wireless Ethernet Compatibility Alliance—WECA, and being a subset of IEEE 802.11i). Then, the station is able to associate to the correct access point.

That solution requires prior entry of necessary data by the user in the device to be connected, which may be rather tedious for long size data. Furthermore, the station may not provide a full keyboard but only a simple remote control for entering the data. This is usually the case when the station is not a PC (for "Personal Computer") but for example a wireless multimedia device or telephone. It may thus be necessary for the user to access the relevant characters one after the other, to scroll through a virtual keyboard displayed on a terminal (e.g. television screen), so as to enter the correct SSID and security key. Only then is the device able to associate.

That process can be rather lengthy and frustrating. Indeed, the security key alone can be up to 26 characters, which are typically displayed as asterisks (for security), so that a mistake is easily done. Also, if association fails, there is no indication of the failure reason.

Document US-2003/031151 concerns a roaming technique in wireless local area networks. A packet gateway node (noted "PGN") acts as a mobile IP (for "Internet Protocol") home agent with authentication of a mobile node (noted "MN") handled by a GPRS/UMTS network (for "General Packet Radio Service" and "Universal Mobile Telecommunication System"), before the packet gateway node ever sees data traffic to establish a mobile IP authentication key. A shared key may be established by an unauthenticated key exchange method such as notably Diffie-Hellman method. Thus, a shared secret key and a security association are set between the MN and the PGN. An authentication value obtained from hashing the key and a security parameters index derived from the security association are then used at the PGN for authenticating the MN. In that way, when the MN sends a mobile IP registration request to the PGN, authentication is performed and the PGN sends back a mobile IP registration reply.

That technique simplifies connection of mobile nodes to WLAN networks for portable cellular phones. However, initial establishment of the key between the MN and the PGN is unauthenticated, and therefore leaves some flaws in the security. Consequently, though quite adapted to the field of portable cellular phones, the system does not appear completely satisfactory in other cases, notably for wireless home networks.

Document U.S. Pat. No. 5,539,824 describes a method for safe key distribution and authentication in a data communication network, notably in a WLAN. Individual remote stations are thus wirelessly connected to an installed base station. For achieving security by reliably authenticating the exchanges of data between communication parties, session keys are established and distributed to the network components. For that, a first installed base station is used to generate a network key and a backbone key, and to subsequently install additional base stations while avoiding communication of the network key through the wireless network—the network key being for example transmitted via wired network circuits.

Though that technique provides a reliable security level, it requires specific operations by the user for safely transferring the network key data from the first installed station to the next ones. Further, it does not solve the problem for the installation of the first base station.

Document US-2003/0169713 concerns a zero-configuration secure mobility networking technique for WLAN, relying on a Web-based authentication. A link-layer authentication process facilitates network-to-user authentication and generation of session-specific encryption keys for air traffic using digital certificates. A Web-based authentication server uses a Web page for initial authentication and a Java applet for consequent authentications. Once a user is authenticated to the WLAN, a mobile host of that user obtains full IP connectivity and receives secure mobility support from the WLAN.

In that technique, security provisions are thus delegated to a central server in the network. This leaves the possibility of some potential piracy intrusion into the server, to obtain relevant authentication data and later gaining unauthorized access to the WLAN.

Document US-2002/0061748A1 describes a technique for securely and easily registering and authenticating a wireless base station and a wireless terminal in a WLAN. The registration is carried out first by the public key cryptosystem of the terminal, and then the authentication is carried out by the secret cryptosystem of the base station.

Though that technique simplifies connection of mobile nodes to WLAN, it offers a limited level of security. It uses the insecure WEP algorithm of 802.11.

Further, Thomson Company has commercialized a DSL modem under the name of "Speed Touch 570", which provides for secure association mechanism in a WLAN, in a simple way for the user. The modem comprises a special touch to be pressed by a user for opening a time window, during which a station may be associated with the network. Prior to pressing the touch, the user must have first registered the relevant parameters in that station (the SSID, which is here implemented as a key). Therefore, when association is required, the user has just to push one button and all further steps are done automatically.

Though the association is user-friendly, it requires preliminary recording of relevant parameters in the station. Also, security could be improved, since only the SSID is recorded in the station as a key and only the MAC address (for "Medium Access Control" of IEEE 802.11 standard) of the client is registered in the modem. However, entering also a special security key would involve additional prior operations by the user.

The present invention concerns a WLAN association device, able to offer both user-friendly and secure technique. The association device of the invention may enable to trigger association through very limited and simple operations, without the need of special additional user input data or material and in a possibly very secure way.

The invention concerns also a WLAN association process, a modem and a computer product having the advantages of the association device of the invention.

It applies notably to the field of wireless home networks, but also more generally to other fields where wireless local area networks are involved.

To this end, the invention relates to a WLAN association device enabling to associate a new station to a WLAN, via an access point provided through a central apparatus of that WLAN. The association device comprises:

receiving means for receiving signals from the station at the central apparatus, sending means for sending signals from the central apparatus to the station, recording means for recording the station as being part of the WLAN, under wireless exchanges between the station and the central apparatus initiated by an association request sent by the station, management means for managing the identity of the WLAN that is the service set identifier, noted WLAN SSID, and time window means intended to trigger the opening of a time window, those recording means being able to be initially activated only during the opening of that time window.

According to the invention, the management means are intended to automatically activate a temporary association service set identifier, noted association SSID, for the recording of the new station during the time window.

The recording means are said to be "able to be initially activated only during the opening of the time window" in the sense that if they are triggered before or after the time window, the association request sent by the station is ignored. In return, if they are triggered when the time window is still open, even at the end thereof, the association process may be pursued even after the time window is over.

The definition of the association device of the invention relies on various "means" that must be understood as purely functional means, which induces nothing on their physical implementation. Notably, several means may be grouped in a same component, or given means may be distributed in several material entities.

Surprisingly, the automatic providing of an extra SSID for the registration process, the association SSID, is combined with a prior step of opening the time window. When the time window means trigger the opening of the time window, the central apparatus activates the association SSID that is used for the registration process only. Namely, a natural temptation for a skilled person would be to use the same SSID that is used for the WLAN for the association process, similarly to what is indicated in the 802.11 specification. The fact that an extra SSID is used temporarily enhances the security scheme of the registration process. The association SSID is intended to be different from the SSID used for WLAN identification.

According to an embodiment of the association device, the management means are intended to activate a single SSID at the same time in the WLAN, so as to using the association SSID during the time window and using the WLAN SSID outside the time window. In this case the stations that have already been associated do not participate to the WLAN traffic during the time window. The new station has then all the resources available, and does not interfere with other stations.

In an embodiment of the association device, the management means are intended to activate multiple SSID simultaneously in the WLAN, the association SSID and the WLAN SSID being activated simultaneously during the time window. In this case the stations that are already associated are not disrupted by the association process. The association SSID might not be disclosed in the beacon frame that indicates only one SSID that is the WLAN SSID. The association SSID might then have been recorded before in the station, so that the station is able to perform the association process.

At the end of the association session, the central apparatus preferably closes the access to the association SSID until the WLAN access feature is next reactivated. And before the access to the association SSID is closed, the station disassociates from the association SSID.

Advantageously, during the time window, receiving means are such that no access is permitted to other MAC addresses than the association device. In other words, the receiving means only accept data frames coming from the station with the MAC address of the association device as the destination address. This can permit to limit the traffic, during the timeframe, for the registration purpose.

According to an embodiment of the association device, the time window means are intended to trigger the opening of a time window when the user executes a physical action (ACTION) on the central apparatus. The user might then be present next to the central apparatus for enabling any new device association, but after a mere physical action, all may be automatically done in a reliable way without specific preparation steps. By "physical action", it must be understood an action which must be executed directly on the central apparatus itself, and not remotely. Thus may be notably pressing a button thereon, or touching a given part of a screen, or pulling a special element. Thus, it may be possible to avoid any necessity of keyboard input, and automatic configuration may be obtained by for example simply hitting a button at the access point.

The association device of the invention thus appears as a very interesting way to obtain a "single click" safe and robust mechanism for adding wireless network element into an existing network (such as a home network).

The involved mechanism may support all wireless clients that have been previously installed, while requiring no additional installation of software drivers.

According to an embodiment, the association device further comprises securing means for automatically providing the central apparatus with at least one central secret key (K), at least one station secret key (K') corresponding to the central secret key (K) being available to the station, the securing means being intended to trigger a sending of at least part of the station secret key (K') to the station when the wireless exchanges are initiated, and the recording means being further secured by means of the central and station secret keys (K, K').

The central key and the station key "correspond" in that they form a pair for enciphering/deciphering. They may notably consist in a same secret key, used for both enciphering and deciphering messages. They may also be respectively different encrypting key and deciphering key, or the reverse. Two pairs of encrypting and decrypting keys may also be exploited, the central apparatus and the station being provided each with one of the encrypting keys and one of the decrypting keys, corresponding respectively to the other decrypting key and the other encrypting key in the other entity.

The central secret key accessible by the central apparatus as well as the station secret key may have been recorded before in the central apparatus and/or in a common database, or be generated in real time during the association process. However, the securing means are intended to trigger the (possibly partial) sending of the station secret key(s) to the station only when the wireless exchanges between the central apparatus and the station, namely the association process, have been initiated. The key may be obtained by the station notably from the central apparatus, through appropriate key exchange, or from a database shared between the station and the central apparatus and accessible through wired communication paths. In the latter case, a triggering signal may in particular be sent by the central apparatus to a database manager for allowing the sending of the station secret key from the database to the station.

The automatic providing of the secret key to the central apparatus is combined with a prior step of user physical action on the central apparatus for opening the time window. Namely, a natural temptation for a skilled person could be to trigger the opening of a time window for automatic association, but after having recorded the relevant secret key(s) in both the central apparatus and the station, similarly to what is done in the Thomson product Speed Touch 570. On the other hand, the skilled person could be incited to provide for automatic key exchange between the central apparatus and the station to be associated, as inspired by document US-2003/031151, and/or for automatic authentication by means of a special server, as derived from document US-2003/0169713. However, in those cases, it would be considered as inappropriate that the user has any kind of direct action on the central apparatus, since this would appear contrary to the automation of the association process provided by the techniques above.

Advantageously, the physical action consists in pressing a physical button on the central apparatus.

Also, preferably, the time window means are intended to allow only one station to be associated with the WLAN for the concerned time window.

This allows to freeze the association process as soon as a first station has manifested itself by sending an association request. Therefore, to connect two different stations to the WLAN, two association sessions must be successively opened. Thereby, the security level is increased, since a parasitic second station may not take advantage of a time window opening intended for a first station, for requesting a hacking connection to the WLAN.

Besides, the recording means are preferably intended to confirm the recording of that station only when the user executes a further physical action on the central apparatus. That further physical action advantageously consists in pressing a physical confirmation button on the central apparatus, the confirmation button being preferably the button for opening the time window.

That embodiment gives a very high protection level, especially when combined with the features above. Indeed, even if a piracy connection has been attempted during the opening of the time window, it will not be recognized as valid by the user when the latter must confirm the correct association of the station. Since the user must be close to the central apparatus for confirmation, fake remote confirmation is excluded. Local physical control is thus combined with possibly sophisticated automatic remote provisions, to bring a very high protection level.

The use of the same button for time window opening and for confirmation is particularly attractive for its, implicity and user-friendliness.

Several features above are advantageously combined, for guarding against malicious attempts to access the WLAN. In a particular implementation, this may lead to the following safeguards that enable to securely transfer information required for access to the WLAN to whichever device correctly performs the initialization physical action:

restricted time window during which stations may join the network;

only one station may join the network during any association session;

after the currently associating station has achieved secured communications with the central apparatus, but before any sensitive information is provided, the user is required to confirm that the intended new station successively connected with the network.

According to a first preferred embodiment related to key providing, the securing means are intended to cause wireless key exchange between the station and the central apparatus, including the sending of the at least one part of the station secret key to the station from the central apparatus.

This may be based on a mechanism that allows for parameters of the operational wireless network to be securely transferred from the central apparatus to the station to be associated, across a separate secured wireless network.

The securing means are then advantageously intended to cause Diffie-Hellman key exchange between the station and the central apparatus.

According to a variant embodiment, the central apparatus being configured in factory with a digital certificate giving it a specific identity, which is validated by a digital signature, the securing means are intended to cause transmission of the central secret key using standard transmission protocols, such as EAP-TLS protocols (for "Extensible Authentication Protocol with Transport Layer Security").

Further, the secret keys are advantageously keys according to Wi-Fi Protected Access standard (WPA).

According to a second preferred embodiment related to key providing, the securing means are intended to cause the at least part of the station secret key to be provided to the station from a database shared between the station and the central apparatus.

Another object of the invention is a modem, characterized in that it comprises an association device according to any of the embodiments of the invention.

The invention also relates to a WLAN association process enabling to associate a new station to a WLAN, via an access point provided through a central apparatus of that WLAN. The association process comprises the following steps:

exchanging signals between the station and the central apparatus, recording the station as being part of the WLAN, under wireless exchanges between the station and the central apparatus initiated by an association request sent by the station, and opening a time window, that recording step being able to be initially activated only during the opening of the time window.

According to the invention, the association process comprises the step of automatically activating a temporary association service set identifier, noted association SSID, for the recording of the new station during the time window.

The association process is preferably intended to be executed by means of an association device according to any form of the invention.

Another object of the invention is a computer program product comprising program code instructions for executing the steps of the association process according to the invention, when that program is executed on a computer. By "computer program product", it is meant a computer program support, which may consist not only in a storing space containing the program, such as a diskette or a cassette, but also in a signal, such as an electrical or optical signal.

The invention will be better understood and illustrated by means of the following embodiment and execution examples, in no way limitative, with reference to the appended figures on which:

Figure 1:
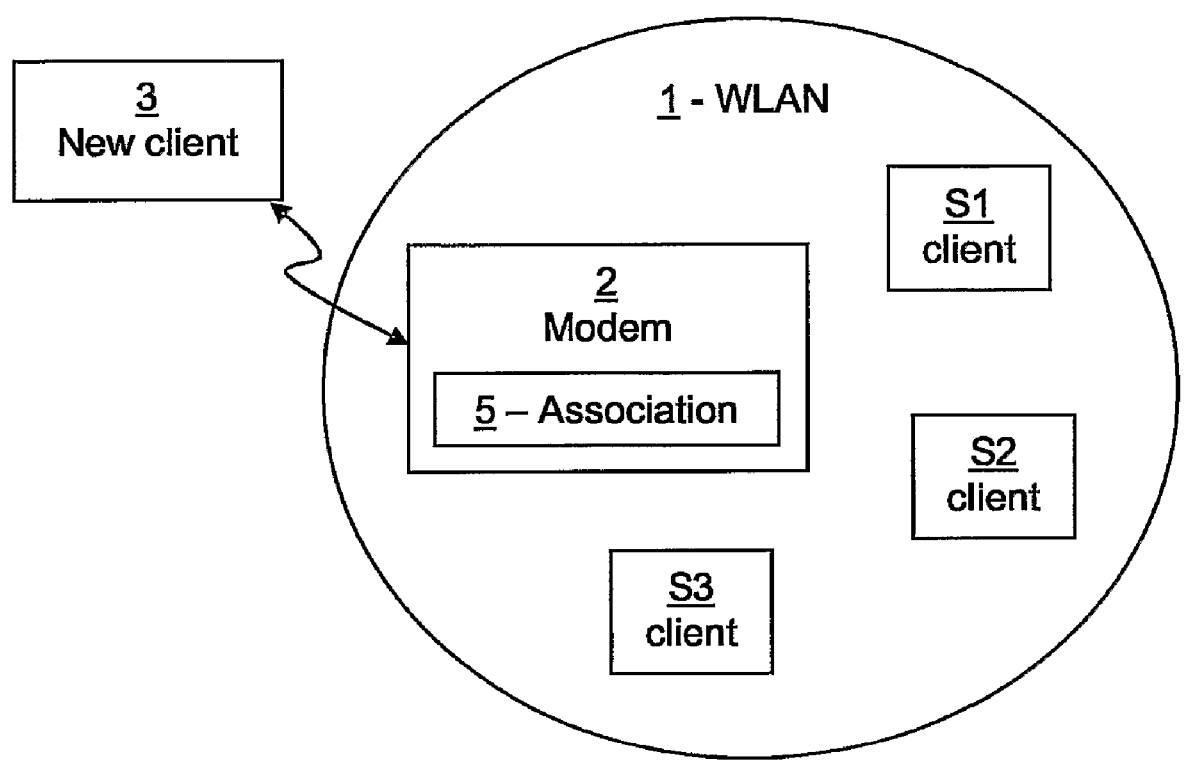
FIG. 1 is a schematic diagram showing a WLAN and a new client to be associated thereto, the WLAN including a modem that comprises an association device compliant with the invention.
Figure 2:
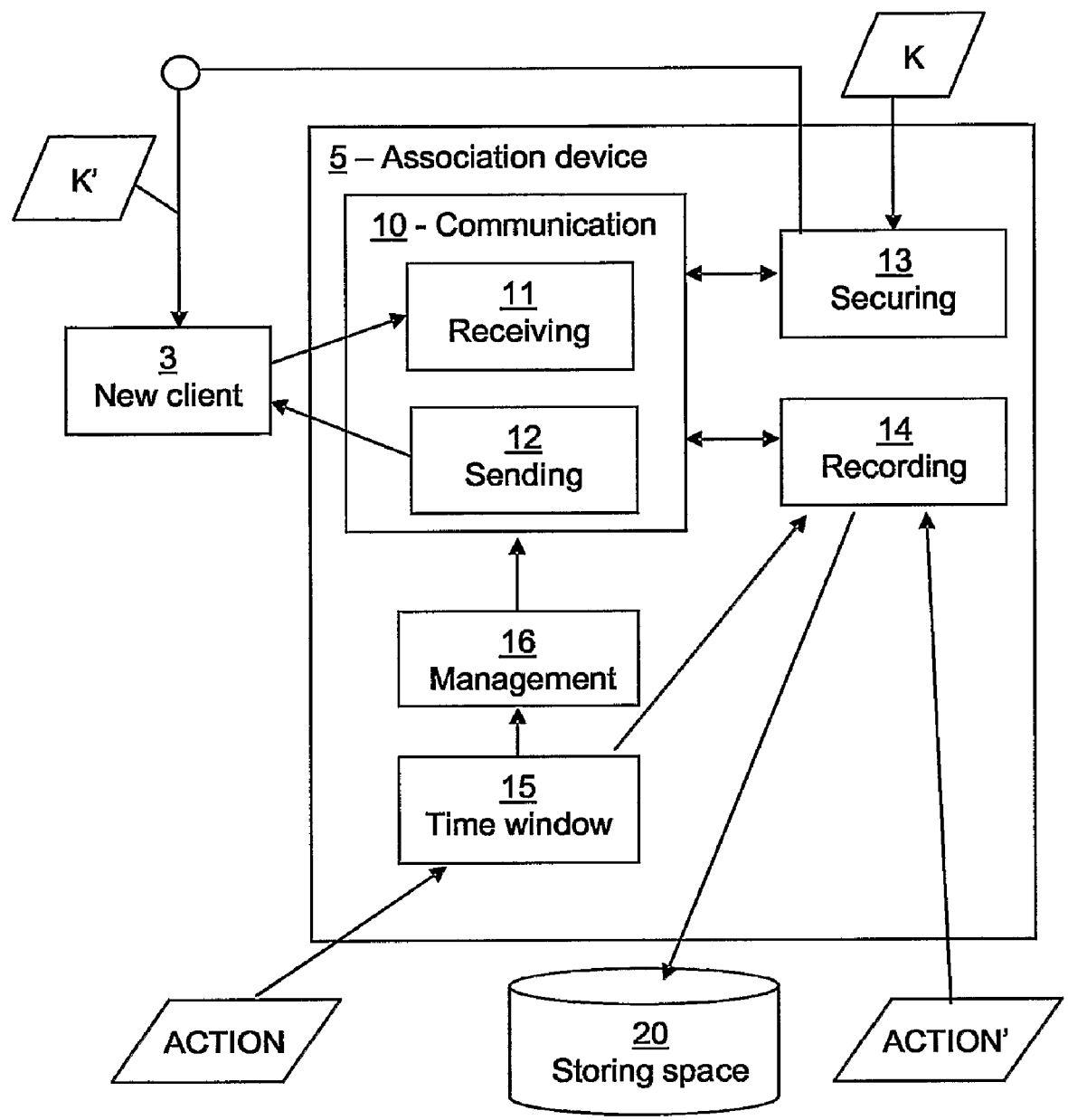
FIG. 2 is a block diagram detailing the association device of FIG. 1.
Figure 3A:
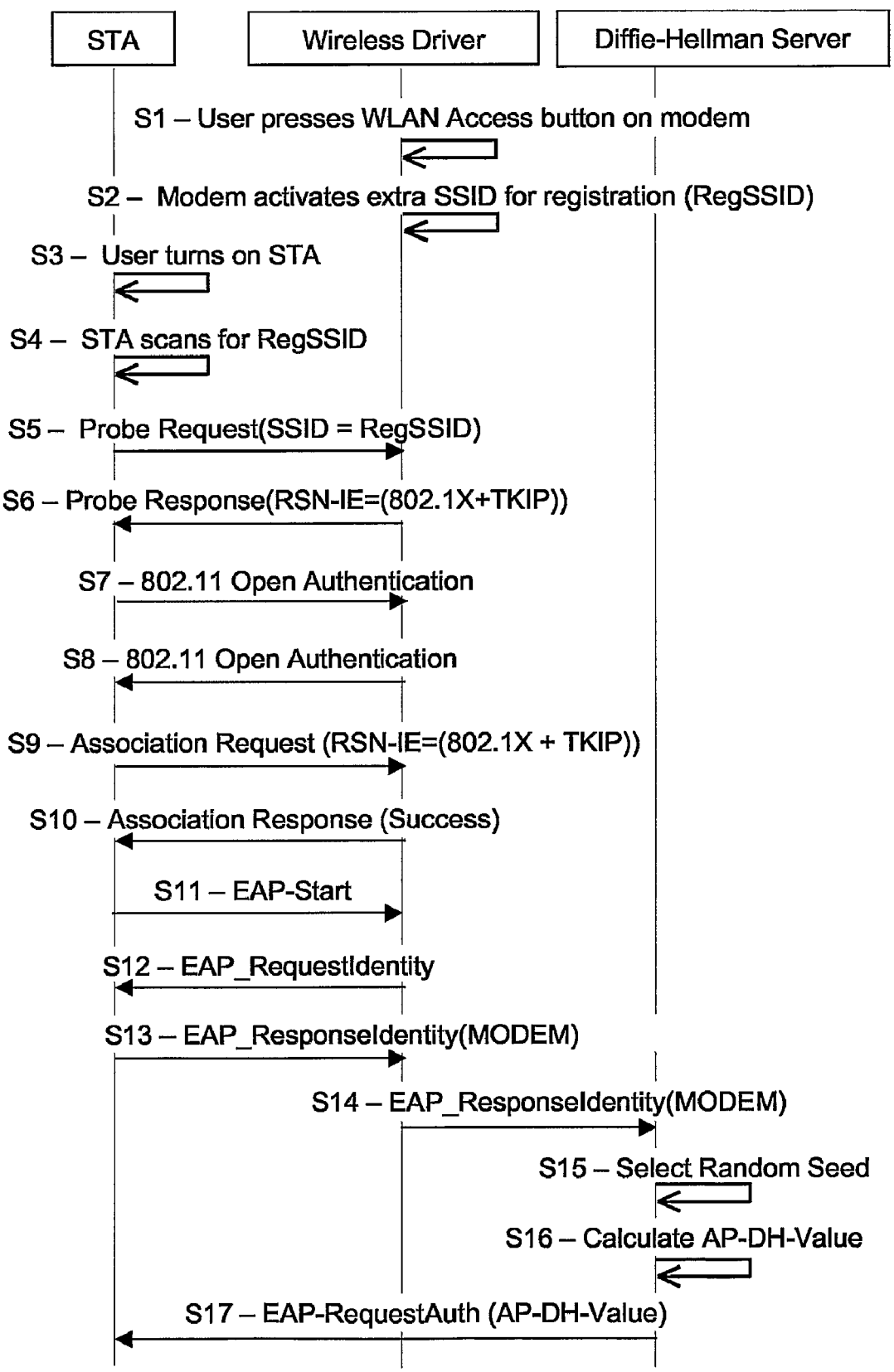
Figure 3B:
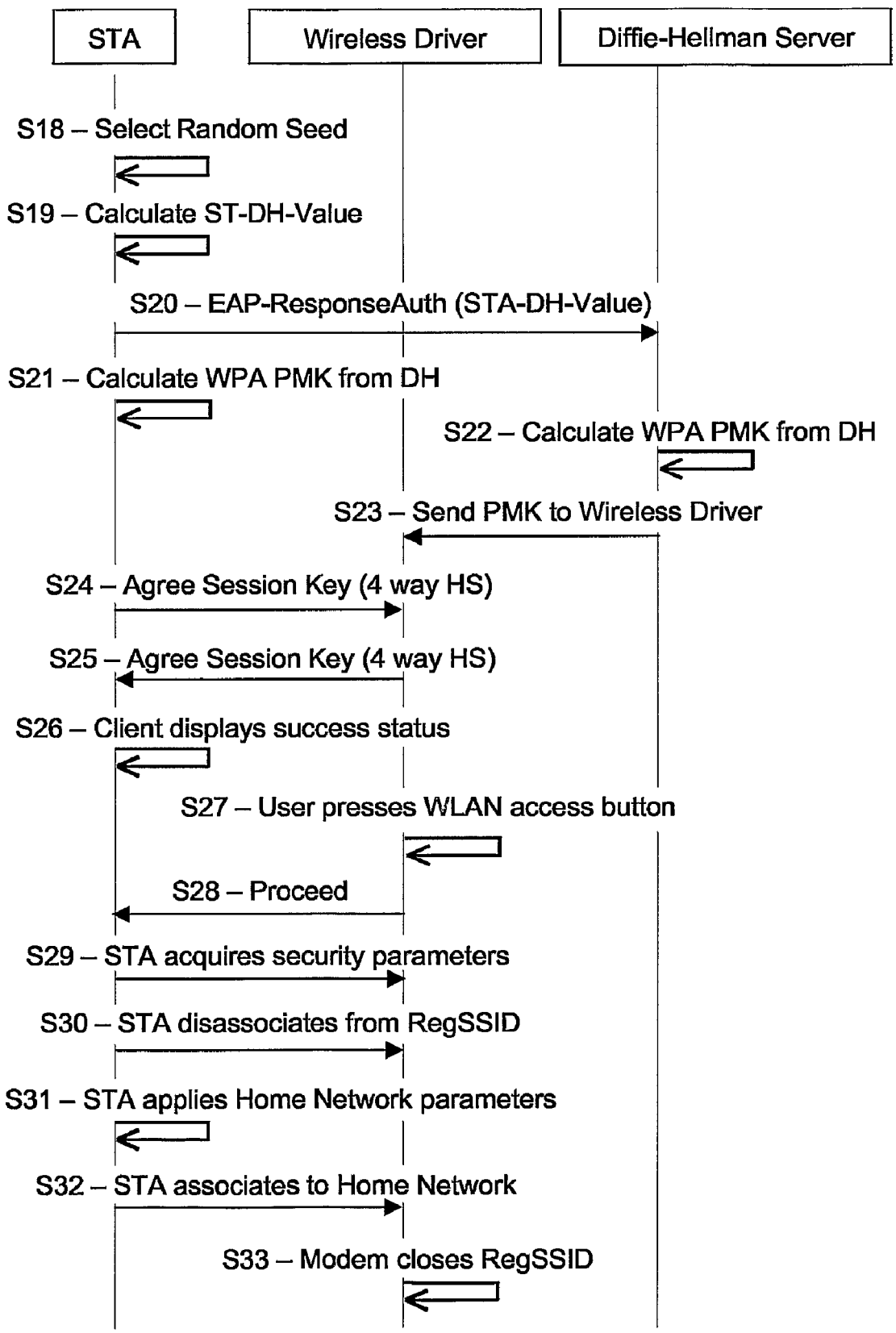

and FIGS. 3a and 3b provide complementary parts of a flow chart showing successive steps executed with a special implementation of the association device of FIGS. 1 and 2, relying on Diffie-Hellman key exchange.

In FIG. 2, the represented blocks are purely functional entities, which do not necessarily correspond to physical separated entities. Namely, they could be developed in the form of software, or be implemented in one or several integrated circuits.

A WLAN 1 (FIG. 1) comprises a modem 2 that forms an access point to the WLAN for clients. Another apparatus than a modem could be used for the access point, such as for example router or a gateway, and two or more access points could be present in the WLAN. In the representation, several clients S1, S2 and S3 are already associated with the WLAN network 1 (that uses customer's local configuration). The modem 2 is provided with an association device 5, which is activated for any new association.

A potential new client 3 (not yet configured with customer's configuration) constitutes a station that communicates with the modem 2 to be associated with the WLAN 1.

The association device 5 comprises more specifically the following parts (FIG. 2):

a communication set 10 including a receiving module 11 and a sending module 12, for respectively receiving and sending wireless signals; the communication set 10 enables wireless communications with the station 3; the receiving module 11 is notably intended to receive an association request from the station 3;

a securing module 13 for automatically providing the modem 2 with one or more central secret key K, at least one corresponding station secret key K' being available to the station 3; that module 3 is also intended to trigger a sending of at least part of the station secret key K' to the station 3 when association wireless exchanges between the modem 2 and the station 3 are started; the (possibly partial) sending of the station secret key K' may be done or not from the modem 2 (sending module 12);

a recording module 14 for recording the station 3 as part of the WLAN 1 in a storing space 20, under wireless exchanges between the station 3 and the modem 2 initiated by the association request from station 3; those exchanges are secured by means of the secret keys K and K'; further, the association of the station 3 must be validated by a confirmation physical action ACTION';

a time window module 15 for triggering the opening of a time window when a user executes an initialization physical action ACTION on the modem; the recording module 14 is able to be initially activated only during the opening of the time window;

a management module 16 for managing the identity of the WLAN that is the service set identifier, noted WLAN SSID. The association device might support the multiple SSID functionality. When the time window is open, the management module activates a supplementary SSID, the association SSID. When the time window is closed, the management means close the access to the association SSID.

A special example of the association device 5 and associated environment will now be described, the WLAN network 1 being for instance a home network. Therein, the user activates a specific mode of the modem 2 related to "add new client", by pressing a WLAN access button. The modem 2 then indicates it is in this special mode by a distinctive LED display (for "Light Emitting Diode"), for example by flashing red LED.

Thereafter, the modem 2 activates for a short duration a special mode that allows wireless communications between any client and the modem 2, for example the station 3. In the detailed example, the authorized communications are compliant with the IEEE 802.1X standard on authentication. This mode blocks access to other clients than the one currently trying to connect, to services or to the WAN connection. In a favorite implementation, this is achieved without disruption to other users since the modem 2 supports wireless VLAN (for "Virtual Local Area Network")/multiple SSID functionality. In an alternative implementation, the special communication mode requires temporary loss of service to other wireless network devices.

While communicating, the station 3 and the modem 2 use in the illustrated example, WPA-Enterprise/802.1X protocols to establish an exchange of EAP messages (for "Extensible Authentication Protocol", RFC 2284—"Request For Comments") between the station 3 and a server function internal to the modem 2 and associated with the communication set 10.

Alternatively, the modem 2 is in relation with a remote server function on which rely the communications with the station 3. In an example of such a remote server, the modem 2 is a DSL modem and the server is accessible via the DSL link. In another example, the communication of the modem 2 with the remote server is based on Diffie-Hellman exchanges, or on standards such as EAP-TLS (for "EAP with Transport Layer Security", RFC 2716).

Within this standardized protocol exchange, the station 3 and the modem 2 use in the illustrated example a proprietary protocol to agree a WPA key constituting the key K, by using Diffie-Hellman key exchange. The modem 2 only allows one client to negotiate a key per "add new client" session. The station 3 and modem 2 use the agreed key K to negotiate a temporary session key using a standardized "four way handshake" of WPA standard.

The station 3 later informs the user that communication has been successfully established (using whatever visual output medium is available); the user must confirm this successful communication with the modem 2 by pressing the WLAN access button a second time, for a prolonged period—which is advantageously superior to 10 seconds. This guards against the possibility that the "add new client" session be hijacked by a rogue client, since if this is the case, the intended client (station 3) is not able to communicate. If the station 3 fails to communicate properly with the modem 2, it displays a warning message instructing the user to reset the modem 2 and retry the procedure.

Communication between the station 3 and the modem 2 is now secured, and the station 3 discovers the wireless security parameters in use for the full WLAN network 1. This is achieved using, for example, UPnP protocols (for "Universal Plug and Play"), with WLAN profile.

The station 3 now applies the network configuration information acquired from the modem 2 and starts to attempt to find the network 1.

The modem 2 reverts to normal operation for example 30 s after the WLAN access button was pressed for the second time.

The station 3 successively associates with the modem 2. Higher layer protocols can now make use of a MAC level connection (for "Medium Access Control" of IEEE 802.11 standard) to complete the integration of the station 3 into the network 1.

An association scenario based on the example above will now be developed in detail. This scenario involves the steps below (FIGS. 3a and 3b), that concerns the station 3, noted "STA", a wireless driver of the modem 2, and an internal (or remote) Diffie-Hellman server ("DH Server") available to the modem 2, as well as the communications between them:

step S1: a user activates association procedure by pressing the WLAN access button of the modem 2;

step S2: the modem 2 activates the association SSID; this provides a ring-fenced capability to securely transfer the configuration data for the WLAN; no access is permitted for data frames to other MAC addresses than the modem 2;

step S3: the user activates the new client STA (station 3); that station 3 is preprogrammed with Diffie-Hellman parameters, which are the same for all stations STA;

step S4: the station 3 scans for an access point of the network 1 with the association SSID;

step S5: the station 3 probes the network 1 as part of the active scanning process;

step S6: the network 1 responds to the probe and indicates that it permits association using IEEE 802.1X and TKIP (for "Temporal Key Integrity Protocol") protocols, using the RSN-IE (for "Robust Security Network Information Element");

steps S7 and S8: the standard authentication procedure of IEEE 802.11 in Open mode occurs in both directions; this is a legacy exchange and has no value in authenticating the station 3 or the modem 2;

step S9: the station 3 requests association indicating that it supports 802.1X and TKIP protocols;

step S10: association is accepted by the modem 2;

step S11: the client supplicant initiates EAP authentication procedures; in the following steps, the station 3 applies normal WPA-Enterprise procedure to acquire key for network access; however, Diffie-Hellman key exchange occurs instead of usual authentication procedure;

step S12: the modem authenticator requests the client identity as required by 802.11i/802.1X standards; since the modem 2 has no prior knowledge of the device identity, there is no value in providing anything in response other than a predefined identity to indicate that the station 3 is a device which is prepared to use the association protocol;

step S13: the station 3 announces itself as an association enabled device;

step S14: the authenticator of the modem 2 provides the received identity to the DH Server to initiate the key exchange process;

step S15: the DH Server selects a random seed value for this exchange;

step S16: the DH server uses the random seed to calculate an AP-DH-Value (for "Access Point-Diffie-Hellman") according to the Diffie Hellman algorithm;

step S17: the DH Server sends the AP-DH-Value to the station 3;

step S18: the station 3 selects a random seed;

step S19: the station 3 calculates an STA-DH-Value from the random seed;

step S20: the station 3 sends the calculated STA-DH-Value to the modem 2 in response to the received AP-DH-Value;

step S21: the station 3 calculates the secret WPA PMK key value (PMK for "Primary Master Key") K from the seed and the received AP-DH-Value using the Diffie-Hellman algorithm;

step S22: the DH server calculates the secret WPA PMK key value K from the seed and the received STA-DH-Value using the Diffie-Hellman algorithm;

step S23: the DH Server informs the Wireless Driver of the PMK value K;

steps S24 and S25: the station 3 and the Wireless Driver function execute the 802.11i four way handshake to agree pairwise session and group keys; the four way handshake is completely compliant with WPA/IEEE 802.11i to agree PTK (for "Pairwise Transient Key") and GTK (for "Group Transient Key");

step S26: the station 3 informs the user that the secure communications with the modem 2 have been established and prompts the user to authorize the release of security parameters;

step S27: the user presses the WLAN access button on the modem 2 for the second time to authorize the download of network security parameters to the station 3;

step S28: the modem 2 sends a proprietary proceed message to the station 3;

step S29: the station 3 acquires all necessary network security parameters from the modem 2 using an appropriate protocol (e.g. UPnP WLAN profile); this may include the whole home network configuration;

step S30: the station 3 disassociates from the association SSID;

step S31: the station 3 applies the home network parameters and commences trying to join the home network 1;

step S32: the station 3 successfully joins the home network 1;

step S33: the modem 2 closes access to the association SSID until the WLAN access feature is next reactivated.

The Diffie-Hellman (noted "DH") algorithm is for example executed based on the implementation below. A DH key exchange is carried out in the authentication phase of 802.1X standard to generate the WPA Primary Master Key ("PMK"). Two parameters required by the DH key exchange, a base generator g and a big prime number n, are classically preconfigured to the following value in both STA (station 3) and access point (modem 2):

$g=2$ $n=2^{768}-2^{704}-1+2^{64}*\{[2^{638}.pi]+149686\},$ the number n corresponding to the Oakley group 1, as mentioned for example in "New Directions in Cryptography", W. Diffie and M. E. Hellman, IEEE Transactions on Information Theory, v. IT-22, n. 6, pp. 644-654, November 1976.

In practice, the parameters g and n are the same for every device, and are simply pre-configured during manufacturing.

The hexadecimal value of number n is:

| FFFFFFFF | FFFFFFFF | C90FDAA2 | 2168C234 | C4C6628B | 80DC1CD1 | 29024E08 | 8A67CC74 |
|----------|----------|----------|----------|----------|----------|----------|----------|
| 020BBEA6 | 3B139B22 | 514A0879 | 8E3404DD | EF9519B3 | CD3A431B | 302B0A6D | F25F1437 |
| 4FE1356D | 6D51C245 | E485B576 | 625E7EC6 | F44C42E9 | A63A3620 | FFFFFFFF | FFFFFFFF |

During the DH Key Exchange, each of the station 3 and modem 2 generates a random number (the random seeds) as their DH private value, e.g. values x for station 3 and y for modem 2. Those random numbers have good specificities for enabling the system to be secure. The station 3 calculates its DH public value STA-DH-Value as being worth: $g^x \mod n$ and sends it to the modem 2. Likewise the modem 2 calculates its DH public value AP-DH-Value as being worth: $g^y \mod n$ and sends it to the station 3. After that, both station 3 and modem 2 calculate the keying material, which corresponds to PMK calculation for TKIP encryption:

PMK=[!!Require algorithm to convert DH secret value to 256 bits PMK!!]

In a variant embodiment, the modem 2 is configured in the factory with a digital certificate giving it a unique identity, which is validated by a digital signature. This allows the client to set up a secure session using completely standard EAP-TLS protocols. Moreover, the modem 2 is authenticated, thus still improving the security level.

In an example of implementation of such an embodiment, the process is executed according to the following steps, involving a TLS server for the modem 2 further to a wireless driver:

a user activates association feature using the WLAN access button of the modem 2;

the modem 2 activates the association SSID; this provides a ring-fenced capability to securely transfer the configuration data for the WLAN 1; there is no access permitted for data frames to other MAC addresses than the modem 2;

the user activates the new client STA (station 3);

the client scans for an access point with the association SSID;

the client probes the network 1 as part of the active scanning process;

the network 1 responds to the probe and indicates that it permits association using 802.1X and TKIP protocols;

the standard authentication procedure of 802.11 standard in Open mode occurs; this is a legacy exchange and has no value in authenticating the station 3 or the modem 2;

the station 3 requests association indicating that it supports 802.1X and TKIP protocols;

association is accepted;

the client supplicant initiates EAP authentication procedures;

the modem authenticator requests the client identity as required by 802.11i/802.1X standards; since the modem 2 has no prior knowledge of the device identity, there is no value in providing anything in response other than a predefined identity to indicate that the client is a device which is prepared to use the association protocol;

the client device identifies itself as an association enabled device;

the authenticator provides the provided identity to the TLS server to initiate a key exchange process;

the TLS server initiates the security association with the new client;

the station 3 uses the public key of the access point to send a secret for use in future exchanges (the station 3 applies normal WPA—Enterprise procedure to acquire a key for network access, and TLS authentication procedure occurs to authenticate access point—there is no client authentication);

the client validates the signature of the digital certificate received from the modem 2; the provided identity is displayed at the client and the user is asked to confirm that the identity matches the label on the unit;

the user presses an accept button on the client to indicate that the procedure has started with the correct modem 2 as access point;

the station 3 calculates the secret WPA key value K;

the modem 2 calculates the secret WPA key value K;

the TLS server informs the wireless driver of the PMK value K;

the station 3 and the wireless driver function execute the 802.11i four way handshake to agree pairwise session and group keys;

the station 3 and the wireless driver function execute the 802.11i four way handshake to agree pairwise session and group keys;

the client informs the user that the secure communications with the modem 2 have been established and prompts the user to authorize the release of security parameters;

the user presses the WLAN access button on the modem 2 for the second time to authorize the download of network security parameters to the client;

the modem 2 sends a proprietary proceed message to the client;

the client uses established UPnP SOAP messages (for "Simple Object Access Protocol") to acquire necessary WLAN configuration;

the station 3 disassociates from the association SSID;

the station 3 applies the network parameters and commences trying to join the network 1;

the station 3 successfully joins the network 1;

the modem 2 closes access to the association SSID until the WLAN access feature is next reactivated.

In a different embodiment of the association device 5, the station secret key K' (or data necessary for reconstructing that key K') is retrieved from a database shared between the modem 2 and the station 3 to be associated, through a digital certificate sent to the station 3 when the wireless association communication between the modem 2 and the station 3 is initiated (instead of wireless key exchange as above). This may be done notably if the modem 2 and station 3 have a same ISP (for "Internet Service Provider").

The invention claimed is:

1. Wireless local area network association device enabling to associate a new station to a wireless local area network, noted WLAN, via an access point provided through a central apparatus of said WLAN, said association device comprising:

receiving means for receiving signals from said station at said central apparatus, sending means for sending signals from said central apparatus to said station, recording means for recording said station as being part of said WLAN, under wireless exchanges between said station and said central apparatus initiated by an association request sent by said station, management means for managing the identity of the WLAN that is the service set identifier, noted WLAN SSID, and time window means intended to trigger the opening of a time window, said recording means being able to be initially activated only during the opening of said time window, wherein said management means are intended to automatically activate a service set identifier, noted association SSID, used only for the recording of said station during the time window.

2. Association device according to claim 1, wherein the management means are intended to activate a single SSID at the same time in the WLAN, so as to using the association SSID during the time window and using the WLAN SSID outside the time window.

3. Association device according to claim 1, wherein the management means are intended to activate multiple SSID simultaneously in the WLAN, the association SSID and the WLAN SSID being activated simultaneously during the time window.

4. Association device according to claim 1, wherein, at the end of the time window, said management means are intended to close the access to the association SSID until the WLAN access feature is next reactivated.

5. Association device according to claim 1, wherein during the time window said receiving means are such that no access is permitted to other MAC addresses than the association device.

6. Association device according to claim 1, wherein said time window means are intended to trigger the opening of a time window when a user executes a physical action (ACTION) on said central apparatus.

7. Association device according to claim 6, wherein said physical action (ACTION) consists in pressing a physical button on said central apparatus.

8. Association device according to claim 1, wherein it comprises securing means for automatically providing said central apparatus with at least one central secret key, at least one station secret key corresponding to said central secret key being available to said station, said securing means being intended to trigger a sending of at least part of said station secret key to said station when said wireless exchanges are initiated, and said recording means being further secured by means of said central and station secret keys.

9. Association device according to claim 1, wherein said time window means are intended to allow only one station to be associated with said WLAN for said time window.

10. Association device according to claim 1, wherein said recording means are intended to confirm the recording of said station only when said user executes a further physical action (ACTION') on said central apparatus.

11. Association device according to claim 10, wherein said further physical action (ACTION') consists in pressing a physical confirmation button on said central apparatus, said confirmation button being preferably the button for opening the time window.

12. Association device according to claim 8, wherein said securing means are intended to cause wireless key exchange between said station and said central apparatus, including the sending of said at least part of said station secret key to said station from said central apparatus.

13. Association device according to claim 12, wherein said securing means are intended to cause Diffie-Hellman key exchange between said station and said central apparatus.

14. Association device according to claim 12, wherein said central and station secret keys are keys according to Wi-Fi Protected Access standard.

15. Association device according to claim 8, wherein said securing means are intended to cause said at least part of said station secret key to be provided to said station from a database shared between said station and said central apparatus.

16. Modem wherein it comprises an association device according to claim 1.

17. Wireless local area network association process enabling to associate a new station to a wireless local area network, noted WLAN, via an access point provided through a central apparatus of said WLAN, said association process comprising the following steps:

exchanging signals between said station and said central apparatus recording said station as being part of said WLAN, under wireless exchanges between said station and said central apparatus initiated by an association request sent by said station, and opening a time window, said recording step being able to be initially activated only during the opening of said time window, wherein said association process comprises the step of automatically activating a association service set identifier, noted association SSID, used only for the recording of said new station during the time window said association process being preferably intended to be executed by means of an association device according to claim 1.

18. Computer program product, wherein it comprises program code instructions for executing the steps of the process according to claim 17 when said program is executed on a computer.

* * * * *